May 26, 1953      S. A. EARNSHAW      2,639,942
MACHINE FOR APPLYING MATERIAL TO WALLS
Filed Nov. 5, 1948      2 Sheets-Sheet 1
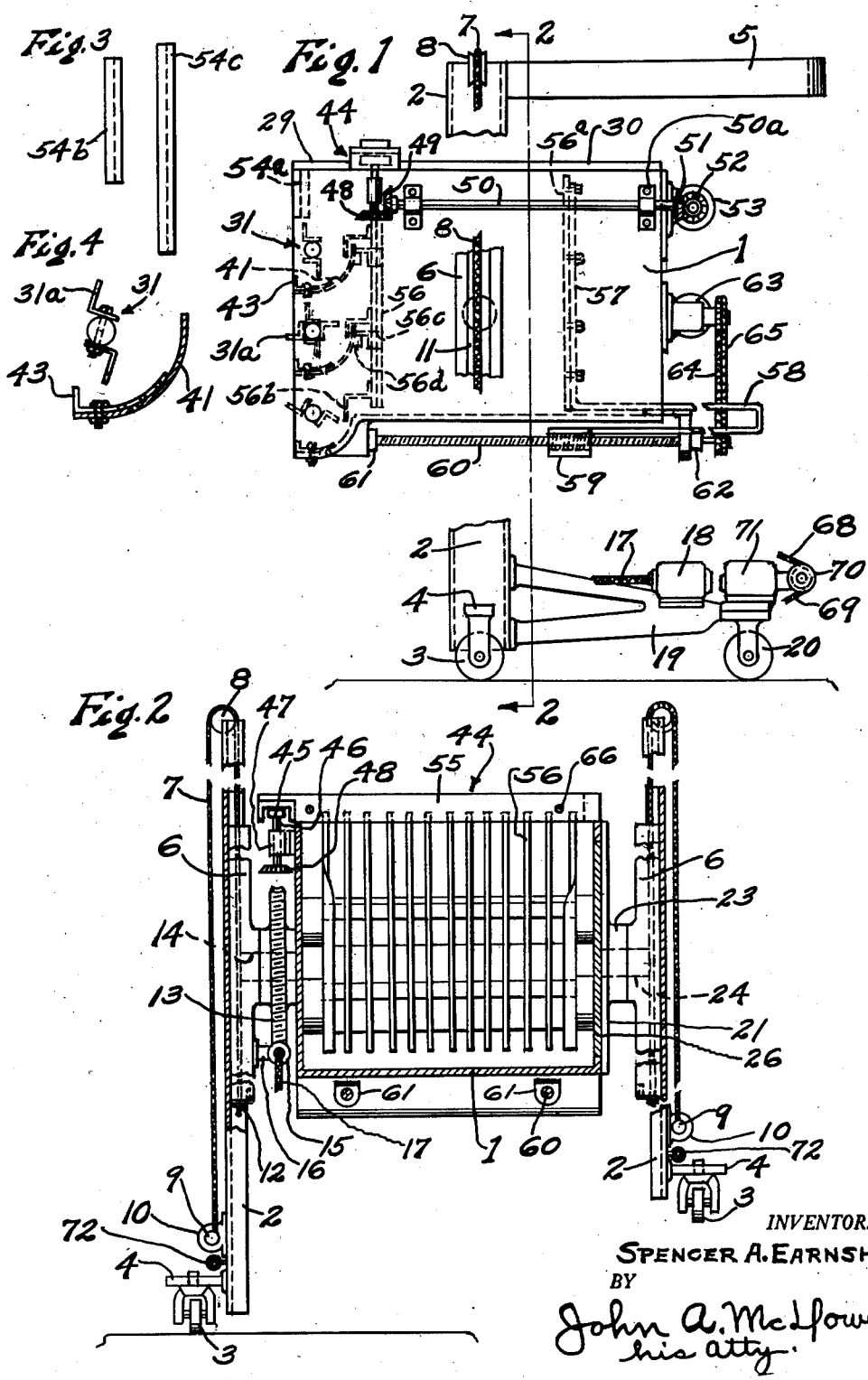
INVENTOR.
SPENCER A. EARNSHAW
BY
John A. McDowell
his atty.

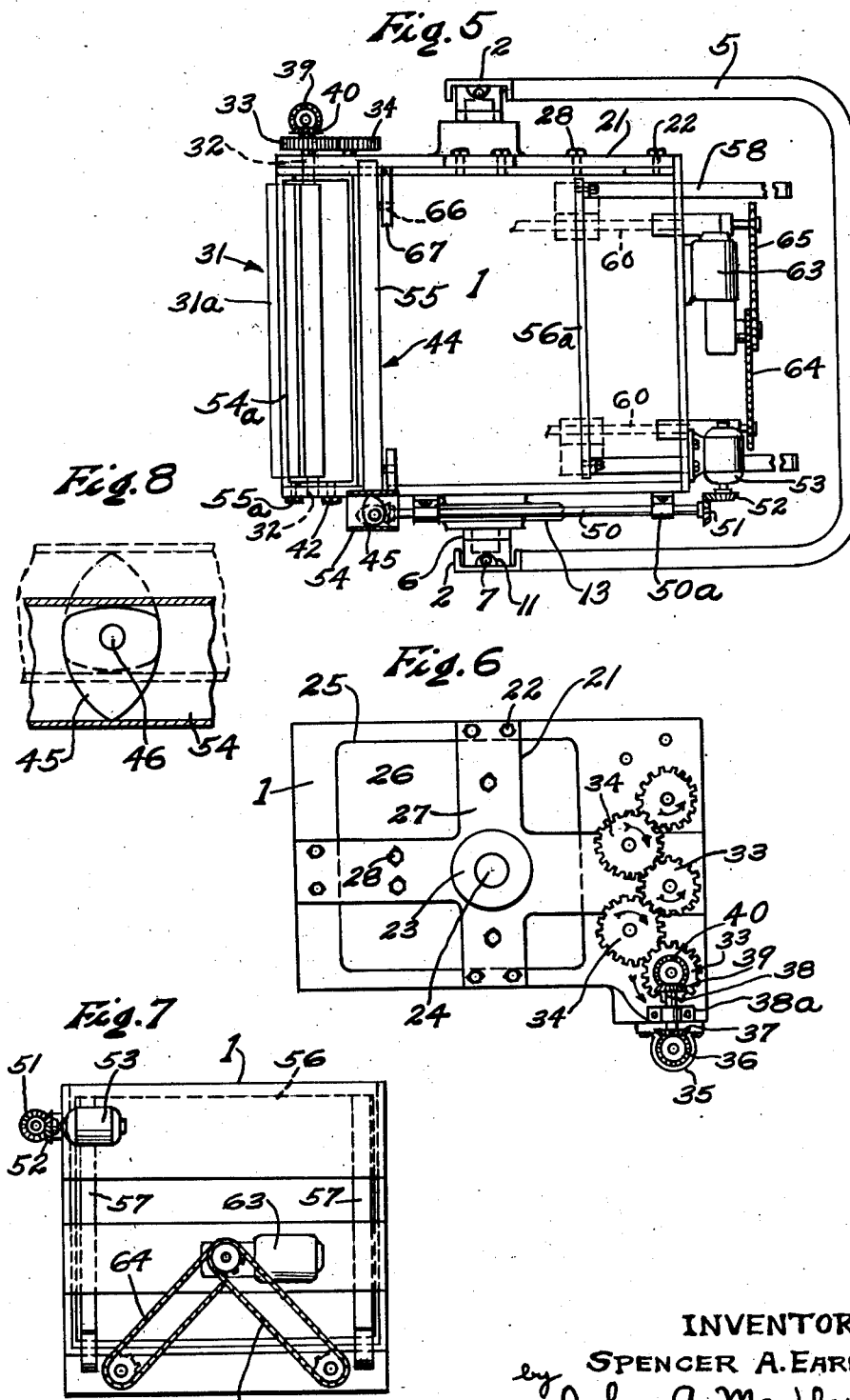

Patented May 26, 1953

2,639,942

UNITED STATES PATENT OFFICE 2,639,942

MACHINE FOR APPLYING MATERIAL TO WALLS

Spencer A. Earnshaw, Los Angeles, Calif.

Application November 5, 1948, Serial No. 58,454

9 Claims. (Cl. 299—62)

This invention relates to coating machines especially adapted for applying a coating material to walls and ceilings and other surfaces, for example the coating of pipes and coating of ditches and tunnels and other shaped articles and for filling forms; and an object of this invention is to improve the method of applying materials in the construction of structures, such as walls, retaining walls and lining or coating.

Another object of the invention is to provide a coating machine which is power driven and which includes a plurality of impellers mounted in the front end of a hopper which is so constructed and arranged to permit the hopper to pivot and having means connected to the hopper slidably mounted in uprights to permit the hopper to be raised and lowered as desired.

Another object of the invention is to provide material wells or loading wells provided with adjusting cut off plates that will regulate the direction of the stream or streams of material thrown by the impellers from the hopper to the surface to be coated.

A feature of the invention is the novel construction and arrangement whereby is provided a bridge breaking mechanism that oscillates in the hopper and in the loading wells and prevents any material from caking thereto, and a pusher plate means that moves the material toward and into the loading wells where the impellers then discharge it from the hopper.

Another object of the invention is to throw a single stream of material or a plural number of streams.

Another feature of the invention is that the machine is to constructed and arranged so that the hopper may be placed on its end or in a vertical position and the hopper supplied with material through the opening shown in the side of the hopper.

An advantage of the invention is to provide a means by removing the loading wells to cut off a surface which has been previously coated.

Another object of the invention is to set the machine in a stationary position to coat articles or surface that come in contact with the stream or streams of materials that are discharged from the machine.

Other objects, advantages and features of invention may appear from the accompanying drawings, the subjoined detailed description and the appended claims.

The invention may have a variety of applications and certain of the features of construction may be embodied in a variety of structures.

The accompanying drawings illustrate the invention.

Figure 1 is a side elevation of the invention with parts broken away to show interior construction and also shows the pusher plate and mechanism for operating same. Also shows the impellers and loading wells and indicates the bridge breaker and mechanism connected thereto. A lid is shown on the hopper top that may be used when desired.

Fig. 2 is an elevational view of the machine partly in section looking in the direction of the arrows as indicated at 2—2, Fig. 1, showing the bridge breaker construction in neutral position mounted in the hopper. Also shows how the hopper is mounted to the uprights and also shows the elevating and lowering cables and cable drums. Parts of the uprights are broken away and partly shown in section to disclose the slides mounted therein.

Fig. 3 shows an end view of two different length front plates for the hopper front when required.

Fig. 4 is an enlarged end elevational detail view partly in section showing the loading well and adjusting cut off plate in relation to the impeller.

Fig. 5 is a top plan view of the machine showing the top of the hopper open disclosing the pusher plate and mechanism connected thereto. Also shows the bridge breaker and mechanism for operating the same.

Fig. 6 is a side elevation of the hopper showing arrangement of the gear drive for the impellers and also shows a side plate and how it is fixed to the hopper side and also holds a hole insert plate in position.

Fig. 7 is a rear end view of the hopper showing the motor and chain drive location for operating the pusher plate.

Fig. 8 is an enlarged fragmental plan detail view showing two different positions of the bridge breaker cam and cam housing. One position shown in broken lines and the other in solid lines showing the cam housing in section.

It is understood that the coating machine may be made in different shapes and sizes and various parts of the invention may be constructed without departing from the spirit of the invention; but the form shown is at present deemed most desirable for easy and cheap construction and ready interchange of parts.

The invention comprises a hopper 1 that is so constructed and arranged to be raised and lowered in the uprights 2 that may be of channel iron construction being supported by the rollers 3 mounted in the brackets 4 as shown in the drawing.

A U-shaped tie member 5 is shown at the top to hold the uprights 2 in position and also to permit a portion of the hopper 1 to be raised beyond the top of the uprights when desired through slide members 6 that are raised and lowered in the uprights 2 by the cables 7 that are mounted over the pulleys 8 and extend downward on the outside of the uprights to winding drums 9 that are operated by the motors 10 that are fixed to the uprights. On the inside the cables 7 extend through a groove 11 in the slide members 6 and are held at the bottom by a cable clamp 12.

Revolvably mounted to the slide members 6 is the hopper 1 having a worm wheel 13 that is fixed to the hopper side in a well known manner and is rotated when desired on a shaft 14 by a worm 15 supported by a bracket 16 on the slide member 6 through a flexible drive shaft 17 and motor 18.

Brackets 19 that form a support for the machine are fixed to the uprights 2 and extend backward to permit swiveled rollers 20 to be attached thereto and also support the motor 18 as shown in Fig. 1 of the drawings.

Fig. 6 shows a spider plate 21 that is fixed to the side of the hopper by bolts 22 and is provided with a boss 23 and shaft 24 that rotates in the slide member 6. An opening 25 is provided in this side and covered by an insert plate 26 that is held in place by the spider arms 27 and bolts 28. This construction and arrangement provides for supplying the hopper with material through the opening 25 by removing the insert plate 26 when the hopper is placed on its end or in a vertical position. When this is done lids 29 and 30 are placed on the top of the hopper as shown in Fig. 1 of the drawing.

In the front end of the hopper 1 is shown a plurality of impellers 31 that are rotatably mounted in the sides of the hopper as at 32 and are provided at one end with drive gears 33 that mesh with idler gears 34 and are driven by the motor 35 that is mounted underneath the hopper 1 and connects through a bevel gear 36 to bevel gear 37 mounted on a shaft 38 that is mounted in bearing 38a at one end that drives a bevel gear 39 at the other end that meshes with bevel gear 40 that in turn drives gears 33. This gear mechanism may be changed from time to time to permit speed changes in the rotation of the impellers as desired and additional impellers may be added when desired as shown in Fig. 6 of the drawings.

Loading wells 41 are provided underneath the impellers and are so constructed and arranged to be held in place by bolts 42 to the sides of the hopper for easy removal when desired.

In Figs. 1 and 4 are shown adjustable cut off plates 43 that determines the direction of the streams of material thrown from the impellers 31.

To prevent the material from caking in and around the loading wells and impellers a bridge breaker mechanism 44 is provided oscillatably mounted inside the hopper in the positions shown in Figs. 1, 2 and 5 of the drawings and is operated by a heart shaped cam 45 mounted at the top end of a vertical shaft 46 that is held in bearing bracket 47.

At the lower end of shaft 46 is mounted a bevel gear 48 that meshes with bevel gear 49 on the horizontal shaft 50 at one end and bevel gear 51 at the other end meshes with bevel gear 52 of the motor 53.

The heart shaped cam 45 is enclosed in the cam housing 54 that is fixed in a well known manner to a top cross member 55 that carries a plurality of knives or blades 56 as shown in Figs. 1 and 2 of the drawings. The horizontal shaft 50 is held in place by the bearings 50a.

In Figs. 1 and 5 is shown a front piece or plate 54a held in place by bolts 55a.

To move the material in the hopper 1 toward the impellers 31 a vertical pusher plate 56a that is fixed on its back side with a pair of vertical arm 57 that have extension members 58 that extend backward through the rear end and underneath the hopper bottom having nut ends 59 that are mounted on the horizontal screws 60 that are mounted at one end in the thrust bearings 61 and at the other end in thrust bearings 62 and operable by the motor 63 through the chain drives 64 and 65 that are mounted as shown at the rear end of the hopper as in Figs. 1 and 7 of the drawings.

The bridge breaker blades 56 are provided with extensions 56b that extend down into the loading wells and tie members 56c keep the blades 56 in rigid position and form a guide slidably mounted on the extensions 56d as shown in Fig. 1 of the drawings.

The cross top member 55 of the bridge breaker mechanism 44 is provided with pins 66 that are slidably mounted in brackets 67 shown fixed to the hopper top that keeps the bridge breaker mechanism in alignment.

Fig. 1 shows and discloses that three streams of material although the machine is not limited to three streams can be thrown which would strike three individual places on a surface, by adjusting the cut off plates, these streams may be thrown at different angles so that all three streams may strike the surface at about the same spot providing the machine is the correct distance where the streams converge.

By removing front plate 54a and the upper loading well 41 including the cut off plate, also upper impeller 31 and upper gear 33, upper idler gear 34 and then insert plate 54b, the machine can then throw two streams only.

When a single stream is desired by the operator, plate 54b is removed and also similar parts as described above, then plate 54c is inserted thus giving a single stream.

I show extra holes in the hopper and parts may be added or removed to bring out the most efficient operation of the machine.

The loading wells 41 are constructed to receive non-setting material such as sand before the machine is started, then the material is fed into the wells and thus gives a cushioning or riding surface to give a proper loading action for the impellers and permits easy cleaning of the loading wells.

The adjusting cut off plate 43 can be raised when desired by putting spacer washers or shims between the plate and bottom of the loading wells 41.

The impellers 31 are provided with angle bars 31a that are moounted longitudinally thereon and that are so constructed and arranged as to extend beyond the front end of the hopper and can be adapted when some of the parts such as the loading wells are removed to cut off a surface which has been previously coated.

It is understood that reversal electric switches will be used in the machine; and proper timing speeds will be used to coordinate the travel of the hopper with the speed of the pusher plate; and variable speed motors may be used throughout the machine.

When applying a surface to a ceiling it is necessary to move the machine backwards and forwards across the floor of a room and to coordinate the joining of the ceiling surface. I provide cables 68 and 69 that are operable on drums 70 by a motor 71 mounted on the bracket 19 as shown in Fig. 1 of the drawings. These cables will be fixed and slidably mounted to the uprights 2 as at 72 and also arranged as desired and connected to points on each side of a room as designated by the operator.

I claim:

1. In a coating machine of the character set forth having a hopper pivotably and slidably mounted to an upright frame; means to pivot said hopper to a desired position and means to raise and lower said hopper; a multiple number of impellers rotatably and separately mounted in the sides of said hopper at the front end; pusher plate means for supplying coating material to the said impellers and power means for revolving the said impellers in the service of discharging said coating material in being applied to a surface to be coated.

2. In a machine for applying material of the character set forth comprising a hopper for holding materials for coating purposes; a multiple number of impellers rotatably and separately mounted in the sides of said hopper at the front end; loading wells mounted underneath said impellers each provided with an adjustable cut off plate in association with an impeller blade in operable to change the direction of a stream of material projected therefrom; pusher plate means slidably mounted inside said hopper to move material toward said loading wells and impellers; power means for revolving the said impellers so they will discharge the material at a desired velocity.

3. In a machine for applying material of the character set forth comprising a hopper for holding materials for coating purposes; a multiple number of impellers rotatably and separately mounted in the sides of said hopper at the front end; loading wells mounted underneath said impellers each provided with an adjustable cut off plate in association with an impeller blade and operable to change the direction of a stream of material projected therefrom; a bridge breaker mechanism provided with a plurality of blades oscillatably mounted inside said hopper that keeps the material from a clogged condition in and around the loading wells and impellers; pusher plate means slidably mounted inside said hopper to move material toward said loading wells and impellers; power means for revolving the said impellers so they will discharge the material at a desired velocity.

4. In a machine for applying material of the character set forth comprising a hopper for holding materials for coating purposes; a multiple number of impellers rotatably and separately mounted in the sides of said hopper at the front end; loading wells mounted underneath said impellers each provided with an adjustable cut off plate in association with an impeller blade and operable to change the direction of a stream of material projected therefrom; said impellers provided with a plurality of angle bars mounted longitudinally thereon; pusher plate means slidably mounted inside said hopper to move material toward said loading wells and impellers and having extension means connected to horizontal screws underneath said hopper operable by a motor; power means for revolving the said impellers so they will discharge the material at a desired velocity and said adjustable cut off plates operable when desired to change the direction of a stream or streams.

5. In a machine of the character set forth having a hopper pivotably mounted to a frame; impellers mounted parallel to each other and power driven to discharge material which is fed to said impellers and means to revolve the hopper so that streams of material projected by the impellers shall strike a surface at right angles or desired acute angles.

6. A coating machine of the character set forth comprising a hopper for containing coating material; a multiple number of impellers rotatably and separately mounted in the sides of said hopper at the front end, each impeller adapted to discharge material therefrom; a multiple number of loading wells mounted in association with said impellers; pusher plate means mounted inside said hopper to feed material to each of said impellers and its associated loading well; a movable carriage upon which said hopper is mounted and adjustable means mounted in said carriage to raise and lower the hopper.

7. A coating machine of the character set forth comprising a hopper for holding materials for coating purposes; a multiple number of loading wells mounted in association with a multiple number of impeller means comprising impellers separately mounted for discharging the materials from said hopper; means comprising a vertical pusher plate mounted inside said hopper mechanically operated to feed material to said impellers and said loading wells; a movable carriage in which said hopper is pivotably mounted; adjustable means mounted in said carriage adapted to raise and lower the said hopper.

8. In a coating machine of the character set forth having a hopper pivotably and slidably mounted to an upright frame; means to pivot said hopper to a desired position and means to raise and lower said hopper and means comprising removable cut-off plates, which may be removed and replaced with other plates to vary the discharge of material in a single stream or in a plurality of streams.

9. In a machine having a frame unit mounted on wheels provided with means to move said frame unit in its work, said moving means includes a motor and cables, a hopper mounted in said frame unit and means to revolve said hopper and means to raise and lower said hopper, a pusher plate in said hopper and power means to move said pusher plate, a bridge breaker in said hopper and means to operate said bridge breaker, a removable plate in the front of said hopper, an impeller mounted below said removable plate, means to drive said impeller, a loading well below said impeller, an adjustable cut-off plate in said loading well, a space in said loading well to hold an inert material and said impeller impels material from said hopper and said loading well when said impeller is driven.

SPENCER A. EARNSHAW.

References Cited in the file of this patent

UNITED STATES PATENTS

| Number | Name | Date |
| --- | --- | --- |
| 1,032,310 | Swenson | July 9, 1912 |
| 1,040,253 | Ray | Oct. 1, 1912 |
| 1,877,269 | Colgren | Sept. 13, 1932 |
| 1,996,885 | Schemann et al. | Apr. 9, 1935 |
| 2,004,978 | Conley | June 18, 1935 |
| 2,380,499 | Brend | July 31, 1945 |
| 2,415,500 | Kennison | Feb. 11, 1947 |